M. ALDEN.

BLOWING FORGES, &c.

No. 119. Reissued July 11, 1848.

THE NORRIS PETERS CO., PHOTO-LITHO., WASHINGTON, D. C.

UNITED STATES PATENT OFFICE.

MANOAH ALDEN, OF RALSTON, PENNSYLVANIA.

IMPROVEMENT IN BLOWERS FOR FURNACES.

Specification forming part of Letters Patent No. 5,513, dated April 18, 1848; Reissue No. 119, dated July 11, 1848.

*To all whom it may concern:*

Be it known that I, MANOAH ALDEN, of Ralston, in the county of Lycoming and State of Pennsylvania, have invented a new and useful Improvement in Blowers for Blacksmiths' Forges and other Uses, which is described as follows, reference being had to the annexed drawings of the same, making part of this specification.

Figure 1:
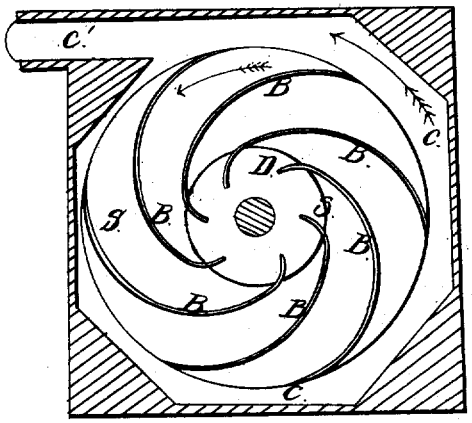
Figure 2:
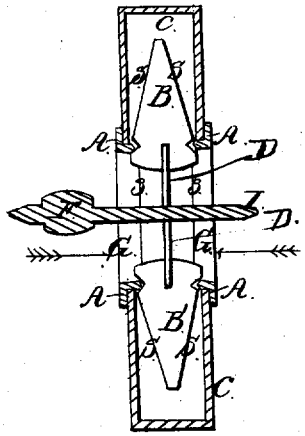
Figure 3:
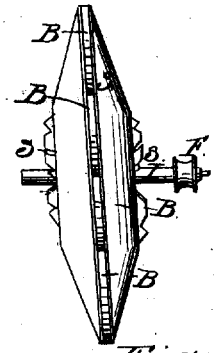
Figure 4:
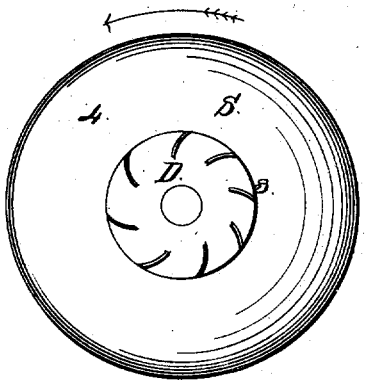
Figure 8:
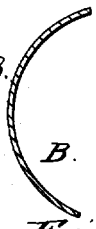
Figure 5:
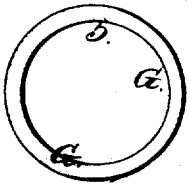
Figure 6:
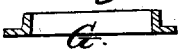
Figure 7:
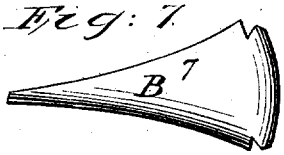

Figure 1 is a vertical section through the center of the blower. Fig. 2 is a transverse section through the center of the blower. Fig. 3 is an edge view of the wheel detached from the case. Fig. 4 is a side view of the wheel detached from the case. Fig. 5 is a plan of the circular guard detached from the case. Fig. 6 is a section of the same. Fig. 7 is a plan of one of the wings detached from the wheel. Fig. 8 is an edge view of the same.

Similar letters in the several figures refer to corresponding parts.

The arrows No. 1 show the direction in which the wheel turns.

This blower consists of a revolving wheel of a peculiar and novel form, being composed of a number of curved, tapered, or otherwise formed wings, B, placed between two frustums of hollow cones or sections of funnels, S, arranged with their bases or larger ends toward each other, and as far apart as the width of the smaller ends of the aforesaid wings B, and affixed to a central shaft, I, by means of a circular central plate or diaphragm, D, whose diameter is a little larger than the diameter of the smaller ends of the frustums of hollow cones, said diaphragm being affixed permanently to the shaft I and to the wide ends of the wings B at the center of the wheel, said wide ends extending to or near the shaft. This diaphragm performs a very important office in the operation of the blower besides that of securing the wings to the shaft. It prevents the currents of air that rush through the openings *s* at the center of the wheel from coming in contact at the center of the wheel and forming eddies and counter-currents. It also causes the currents to enter the wheel separately until they pass the periphery of the said circular diaphragm D, when they unite and pass between the curved wings B, which compress or condense the air in the case by their rapid rotary motion, and which wings do not strike the air in the manner of the radial wings of the ordinary blower, and thus is prevented that disagreeable thumping or humming noise, which is caused by the manner in which the radial wings of the common fan-blower strike the air.

The wings B, being made curved and tapered or otherwise shaped from their inner to their outer ends, and surrounded by a smooth continuous funnel-shaped shrouding, S, or left unshrouded, as preferred, are caused to receive and force the air gradually from the center to the periphery of the wheel, from which t is made to escape into the surrounding stationary case *c* in a thin continuous circular sheet, wherein the air is condensed to the required degree of density without producing any violent concussion or blows similar to those produced by the wings of the ordinary fan-blower.

The external case, *c*, for confining the air, and the tangential tube *c'*, for directing it to the place where it is to be applied, are made in the usual manner.

I do not claim to be the original inventor of a revolving fan-blower with curved or straight wings, as this is in common use; but What I do claim as my invention, and desire to secure by Letters Patent, is—

The circular diaphragm D, in combination with the curved wings B and rotary shaft I, for the purpose herein fully set forth, whether said wings be more or less curved, tapered, shrouded, or unshrouded, or whether they be made in any other way which is substantially the same as that herein described and set forth, by which analogous results may be produced.

MANOAH ALDEN.

Witnesses:
WM. P. ELLIOT,
DAN PEASE, Jr.